W. A. DICK.
MEANS FOR INSULATING ELECTRICAL MACHINES.
APPLICATION FILED FEB. 3, 1910.

1,046,743.

Patented Dec. 10, 1912.

WITNESSES:
C. L. Belcher
Otto S. Schainer

INVENTOR
William A. Dick
BY
ATTORNEY

UNITED STATES PATENT OFFICE.

WILLIAM A. DICK, OF PITTSBURGH, PENNSYLVANIA, ASSIGNOR TO WESTINGHOUSE ELECTRIC AND MANUFACTURING COMPANY, A CORPORATION OF PENNSYLVANIA.

MEANS FOR INSULATING ELECTRICAL MACHINES.

1,046,743.  Specification of Letters Patent.  Patented Dec. 10, 1912.

Application filed February 3, 1910. Serial No. 541,865.

*To all whom it may concern:*

Be it known that I, WILLIAM A. DICK, a citizen of the United States, and a resident of Pittsburgh, in the county of Allegheny and State of Pennsylvania, have invented a new and useful Improvement in Means for Insulating Electrical Machines, of which the following is a specification.

My invention relates to the insulation of electrical machines, and it has for its object to provide simple and effective means for securing insulation to the clamping rings of the commutators of dynamo-electric machines, or to similar ring-shaped members.

Figure 1:
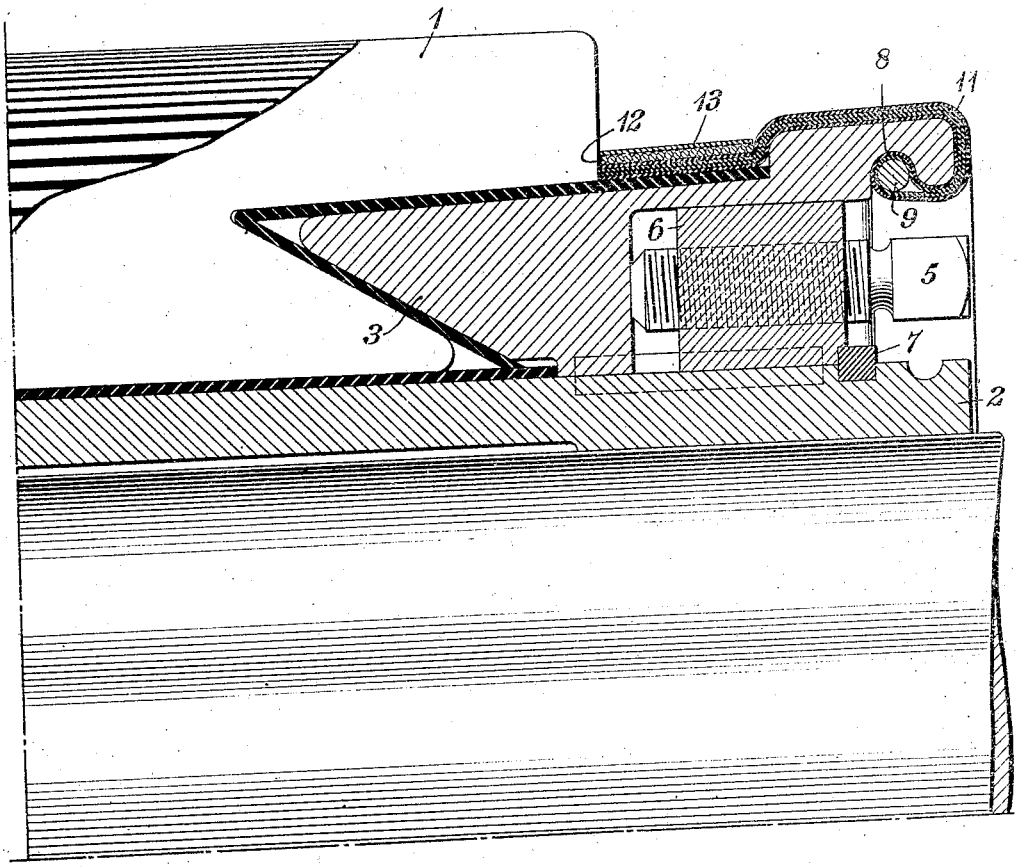
Figure 2:
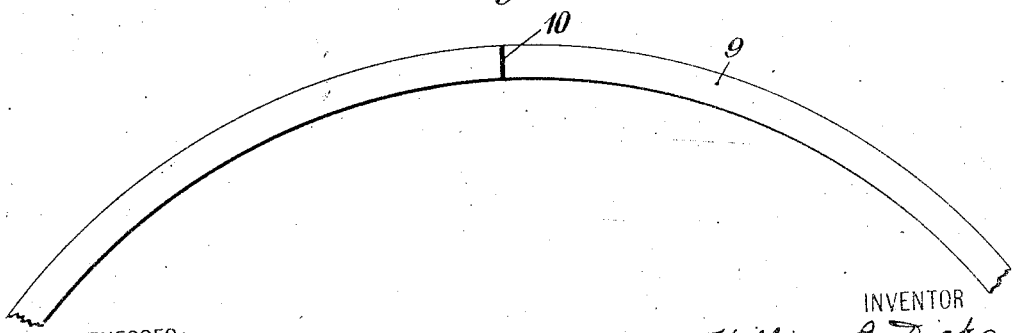

Figure 1 of the accompanying drawing is a longitudinal, sectional view of a part of the commutator of a dynamo-electric machine that embodies my invention, and Fig. 2 is a side view of a part of the clamping ring that is employed in the structure of Fig. 1 for securing the insulation in position.

The invention is shown as applied to the commutator of a dynamo-electric machine, the segments 1 of which are secured in position upon a cylindrical shell or spider 2 by means of a clamping ring 3 having a V-shaped annular end face which engages inwardly extending dove-tail projecting portions of the segments 1, suitable insulation being interposed between the segments and the ring. The ring 3 is forced into engagement with the dove-tail portions of the commutator segments by means of tap bolts 5 that project through and are screwed into a ring 6. The ring 6 is mounted upon the shell or spider 2 within an annular recess that is provided between the outer end portion of the clamping ring 3 and the said spider, and it is seated against a retaining ring 7 that prevents longitudinal movement thereof with respect to the spider when pressure is applied to the clamping ring 3 by means of the bolts 5.

The commutator clamping ring 3 is provided, near its outer end, with an internal circumferential recess 8 in which a clamping ring 9 (Fig. 2) is located, the ring 9 being preferably composed of steel, bronze, or other resilient material, and being split at 10 to permit of its ready insertion in the recess 8. Folded around the ring 9, and secured thereby at its folded portion in the recess 8, are sheets 11 of any suitable insulating fabric or material that extend from the ring 9 over the inner, the end and the outer surfaces of the ring 3 and are secured to the outer circumferential surface of the said ring by means of a helical wire band 12, or by any other suitable means, the band 12 being covered by tape 13 or other suitable insulating material.

In applying the insulation to the ring 3, the desired number of sheets of insulating material are folded about the ring 9, which is then inserted in the internal circumferential recess 8. The insulating sheets are next drawn tightly over the surfaces of the ring 3, and their ends are secured, by means of the band 12, to the outer circumferential surface of the ring 3. The insulating covering 13 for the band 12 is finally applied. The effect of centrifugal force upon the ring 9 is simply to increase its pressure against the ring 3, and to cause it to more securely retain the insulating material 11 in place.

Of course, the invention is not limited in its application to the insulation of commutators but may be applied wherever it is found desirable to insulate cylindrical shells or ring-shaped members.

I claim as my invention:

1. The combination with a ring-shaped member having an internal circumferential recess, of a clamping ring seated in the said recess, and insulating material folded around the said ring and secured at its ends to the outer circumferential surface of the said member.

2. The combination with a ring-shaped member having an internal circumferential recess, of a split clamping ring seated in the said recess, and insulating material folded around the said ring and secured at its ends to the outer circumferential surface of the said member.

3. The combination with a ring-shaped member having an internal circumferential recess, of a clamping ring seated in the said recess and an insulating fabric clamped in the said recess by the said ring.

4. The combination with a ring-shaped member having an internal circumferential recess, of a clamping ring seated in the said recess, insulating material clamped between the said ring and the said member, and means for securing the insulating material to the outer circumferential surface of the said member.

5. The combination with a recessed member to be covered by insulating material, of a clamping ring seated in a recess in said member, and an insulating covering fabric surrounding the ring and clamped in said recess thereby.

In testimony whereof, I have hereunto subscribed my name this 26th day of Jan., 1910.

WILLIAM A. DICK.

Witnesses:
BARRY H. JONES,
B. B. HINES.